(12) United States Patent
Renier et al.

(10) Patent No.: US 10,272,648 B2
(45) Date of Patent: Apr. 30, 2019

(54) FIRE-RESISTANT PANE AND FIRE-RESISTANT GLAZING ASSEMBLY

(71) Applicant: Saint-Gobain Glass France, Courbevoie (FR)

(72) Inventors: Anais Renier, Aachen (DE); Philippe Letocart, Raeren (BE); Andreas Kasper, Aachen (DE); Udo Gelderie, Würselen (DE); Norbert Schwankhaus, Baesweiler (DE); Ulrich Billert, La Celle Saint-Cloud (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 209 days.

(21) Appl. No.: 14/649,402

(22) PCT Filed: Nov. 13, 2013

(86) PCT No.: PCT/EP2013/073700
§ 371 (c)(1),
(2) Date: Jun. 3, 2015

(87) PCT Pub. No.: WO2014/086561
PCT Pub. Date: Jun. 12, 2014

(65) Prior Publication Data
US 2015/0344357 A1    Dec. 3, 2015

(30) Foreign Application Priority Data

Dec. 6, 2012  (EP) ..................... 12195844

(51) Int. Cl.
B32B 7/14 (2006.01)
B32B 17/10 (2006.01)
(Continued)

(52) U.S. Cl.
CPC .......... B32B 17/10302 (2013.01); B32B 7/14 (2013.01); B32B 17/10036 (2013.01);
(Continued)

(58) Field of Classification Search
CPC .......... B32B 2419/00; B32B 17/10036; B32B 17/10165; B32B 17/10174;
(Continued)

(56) References Cited

U.S. PATENT DOCUMENTS 4,830,913 A    5/1989   Ortmans et al.
5,223,313 A    6/1993   Holzer et al.
(Continued)

FOREIGN PATENT DOCUMENTS

DE    2713849    11/1983
DE    3530968    10/1987
(Continued)

Primary Examiner — Lawrence D Ferguson
(74) Attorney, Agent, or Firm — Rankin, Hill & Clark LLP (57) ABSTRACT

A fire-resistant pane including at least one float glass pane with a tin bath side, at least one protective layer that is arranged on the tin bath side in a planar manner, and at least one fire-resistant layer that is arranged on the protective layer in a planar manner, wherein the protective layer contains metal oxide, metal nitride, metal silicide, and/or mixtures or layered compounds thereof.

13 Claims, 10 Drawing Sheets

(51) Int. Cl.
    *C03C 17/00*      (2006.01)
    *E06B 5/16*       (2006.01)
    *C03C 17/245*     (2006.01)
    *C03C 17/22*      (2006.01)
    *C03C 17/32*      (2006.01)
    *C03C 21/00*      (2006.01)
    *C03C 17/42*      (2006.01)
    *C03C 17/34*      (2006.01)
    *B32B 37/14*      (2006.01)
    *B32B 37/18*      (2006.01)

(52) U.S. Cl.
    CPC .. *B32B 17/10165* (2013.01); *B32B 17/10174* (2013.01); *B32B 17/10201* (2013.01); *B32B 17/10311* (2013.01); *B32B 37/144* (2013.01); *B32B 37/18* (2013.01); *C03C 17/008* (2013.01); *C03C 17/225* (2013.01); *C03C 17/245* (2013.01); *C03C 17/32* (2013.01); *C03C 17/3405* (2013.01); *C03C 17/3435* (2013.01); *C03C 17/3494* (2013.01); *C03C 17/42* (2013.01); *C03C 21/005* (2013.01); *E06B 5/165* (2013.01); *B32B 2255/20* (2013.01); *B32B 2255/26* (2013.01); *B32B 2255/28* (2013.01); *B32B 2307/3065* (2013.01); *B32B 2307/31* (2013.01); *B32B 2315/08* (2013.01); *B32B 2419/00* (2013.01); *B32B 2605/00* (2013.01); *B32B 2605/006* (2013.01); *B32B 2607/00* (2013.01); *C03C 2218/36* (2013.01); *Y10T 428/23* (2015.01); *Y10T 428/24967* (2015.01); *Y10T 428/265* (2015.01); *Y10T 428/266* (2015.01)

(58) Field of Classification Search
    CPC ........ B32B 17/10201; B32B 17/10302; B32B 17/10311; B32B 2255/20; B32B 2255/26; B32B 2255/28; B32B 2307/3065; B32B 2307/31; B32B 2315/08
    USPC .................................................. 428/212, 220
    See application file for complete search history.

(56) References Cited

U.S. PATENT DOCUMENTS

| | | | | |
|---|---|---|---|---|
| 5,514,454 A | * | 5/1996 | Boire | C03C 17/3435 359/359 |
| 6,060,002 A | * | 5/2000 | Ishikawa | B32B 7/12 106/18.12 |
| 2002/0045073 A1 | * | 4/2002 | Finley | C03C 17/3417 428/701 |
| 2003/0039843 A1 | * | 2/2003 | Johnson | C03C 17/002 428/432 |
| 2006/0165963 A1 | * | 7/2006 | Fleury | B32B 17/10174 428/212 |
| 2006/0261447 A1 | * | 11/2006 | Seto | C03C 17/23 257/644 |
| 2007/0011988 A1 | * | 1/2007 | Villari | B32B 17/069 52/784.11 |
| 2009/0320824 A1 | * | 12/2009 | Henn | C03C 17/3417 126/500 |
| 2010/0317780 A1 | * | 12/2010 | Cheng | C08K 9/06 524/269 |
| 2011/0226962 A1 | | 9/2011 | Boudreau et al. | |

FOREIGN PATENT DOCUMENTS

| | | |
|---|---|---|
| DE | 4001677 | 3/1991 |
| DE | 197 10 289 | 5/1998 |
| DE | 197 31 416 | 9/1998 |
| DE | 198 48 751 | 12/1999 |
| EP | 0 001 531 | 4/1979 |
| EP | 0 192 249 | 8/1986 |
| EP | 0 590 978 | 4/1994 |
| EP | 0 620 781 | 5/1999 |
| EP | 1 398 147 | 3/2004 |
| FR | 1 378 839 | 11/1964 |
| GB | 1 541 371 | 2/1979 |
| JP | 2001-501165 | 1/2001 |
| JP | 2011-116948 | 6/2011 |
| WO | 94/04355 | 3/1994 |
| WO | 2006/108873 | 10/2006 |
| WO | 2012/006748 | 1/2012 |
| WO | 2013/026606 | 2/2013 |
| WO | 2013/045335 | 4/2013 |

\* cited by examiner

Fig. 8

FIRE-RESISTANT PANE AND FIRE-RESISTANT GLAZING ASSEMBLY

BACKGROUND OF THE INVENTION

Field of the Invention

The invention relates to a fire-resistant pane, in particular for a fire-resistant glazing assembly, with a protective layer to reduce the clouding of the pane due to aging. Moreover, the invention relates to a method for producing such a fire-resistant glazing assembly and use thereof.

Description of Related Art

Fire-resistant glazing assemblies are known in various embodiments and are used, for example, in the construction industry. They are, as a rule, made of at least two transparent support elements, such as two glass panes, between which a fire-resistant layer made of a transparent, intumescent material is arranged. From EP 0 620 781 81, for example, a fire-resistant layer made of a water-containing alkali polysilicate is known. Under the action of heat on the fire-resistant glazing assembly, the water contained in the alkali polysilicate layer vaporizes and the alkali polysilicate foams up. The transparency of the fire-resistant layer is then greatly reduced, in particular for thermal radiation, and protects for a certain time against unwanted passage of heat. The great expansion of the fire-resistant layer results, as a rule, in the shattering of one of the glass panes and, in particular, in the shattering of the glass pane facing the fire source. Consequently, to improve heat protection and mechanical stability, multiple glass panes are arranged one after another with fire-resistant layers therebetween.

Other, improved fire-resistant layers based on alkali silicate with a particularly high water content from 80% to 90% are, for example, known from EP 0 192 249 A2.

Fire-resistant pane and fire-rated glazing assemblies with such fire-resistant layers often exhibit, over time, points or regions of clouding in the visible range.

SUMMARY OF THE INVENTION

The object of the present invention is providing a fire-resistant pane that has improved aging resistance and, in particular, reduced clouding during aging.

A fire-resistant pane according to the invention includes:
at least one float glass pane with a tin bath side,
at least one protective layer that is arranged on the tin bath side of the float glass pane in a planar manner, and
at least one fire-resistant layer that is arranged on the protective layer in a planar manner, wherein the protective layer contains metal oxide, metal nitride, metal silicide, and/or mixtures or layered compounds thereof.

The present invention is based on the finding of the inventors that, in the aging test, depending on glass quality, some float glass panes that were in contact with the fire-resistant layer with their tin bath side exhibited a significant clouding of the view due to the arrangement made up of the float glass pane and fire-resistant layer. In contrast, in the case of float glass panes that were arranged with their atmosphere side in contact with the fire-resistant layer, only slight or no clouding of the view appeared in the aging test. Through the introduction of a protective layer according to the invention between the tin bath side of the float glass pane and the fire-resistant layer, it proved possible in the aging test to prevent or to significantly reduce clouding of the view.

The invention can be understood in the following model: During production, the tin bath side of the hot float glass pane is in contact with the tin bath. This results in the formation of a surface that, depending on the morphology of the tin layer, corrodes inhomogeneously during contact with a typically alkaline fire-resistant layer and, after aging, can develop a cloudy appearance. The atmosphere side of the float glass pane exhibits, on contact with the alkaline fire-resistant layer only slight and homogeneous corrosion, which results in slight or no clouding. Through the introduction of the protective layer according to the invention, the corrosion of the tin bath side during contact with the alkaline fire-resistant layer is reduced and homogenized such that, like the atmosphere side, only slight or no clouding is visible.

In an advantageous embodiment of the fire-resistant pane according to the invention, the fire-resistant layer is alkaline.

The fire-resistant layer according to the invention advantageously contains alkali silicate and preferably alkali polysilicate. Such fire-resistant layers are, for example, known from EP 0 620 781 81 or EP 0192249 A2. Alternative fire-resistant layers contain alkali phosphate, alkali tungstate, and/or alkali molybdate, as is known from DE 35 30 968 C2.

Other alternative fire-resistant layers contain a hydrogel with a solid phase made of a polymers and preferably of polyacrylamide or N-methylolacrylamide, as is known from DE 27 13 849 C2, or polymerized 2-hydroxy-3-methacryloxypropyltrimethyl ammonium chloride, as is known from DE 40 01 677 C1.

The thickness of the fire-resistant layers can vary widely and be adapted to the respective requirements of the intended use. Advantageous fire-resistant layers have, in the case of silicates, a thickness h from 0.5 mm to 7 mm and preferably from 1 mm to 6 mm. In the case of hydrogels, the thicknesses are between 8 mm and 70 mm.

According to the invention, the protective layer contains at least one metal oxide, one metal nitride, one metal silicide, and/or mixtures or layered compounds thereof. The metal oxide is advantageously noncrystalline. It can preferably be amorphous or partially amorphous (and thus partially crystalline), but is not completely crystalline. Such a noncrystalline protective layer has the particular advantage that it has slight roughness and, thus, forms an advantageously smooth surface for the layers to be applied above the protective layer, with scratches and point defects being filled in.

The protective layer can contain, for example, at least one oxide of one or a plurality of the elements tin, zinc, indium, tungsten, silicon, titanium, zirconium, hafnium, and gallium. Alternatively, the protective layer can contain a nitride of one or a plurality of the elements tin, zinc, indium, tungsten, silicon, titanium, zirconium, hafnium, and gallium. Alternatively, the protective layer can contain a silicide of one or a plurality of the elements tin, zinc, indium, tungsten, titanium, zirconium, hafnium, and gallium.

In an advantageous embodiment of the fire-resistant pane according to the invention, the protective layer contains dopants, for example, of antimony, fluorine, silver, ruthenium, palladium, aluminum and tantalum. The fraction of the dopant in the metal fraction of the protective layer in weight-percent (wt.-%) is preferably from 0 wt.-% to 10 wt.-% and particularly preferably from 1 wt.-% to 5 wt.-%. Fire-resistant panes with protective layers that have such a dopant exhibited particularly little clouding during aging.

In an advantageous embodiment of the fire-resistant pane according to the invention, the protective layer contains tin oxide, zinc oxide, or mixed tin-metal oxide. The protective layer contains very particularly preferably tin oxide or mixed tin-zinc oxide. Fire-resistant panes with protective layers that contain tin exhibited particularly little clouding during aging.

In an advantageous embodiment of the fire-resistant pane according to the invention, the protective layer contains a tin-zinc oxide with a ratio of zinc:tin from 5 wt. %:95 wt.-% to 95 wt.-%:5 wt.-% and preferably from 15 wt.-%:85 wt.-% to 70 wt. %:30 wt.-%. Protective layers made of tin-zinc oxide with such mix ratios are particularly resistant and exhibit particularly little clouding during aging.

In an advantageous embodiment of the fire-resistant pane according to the invention, the protective layer contains $Sn_xZn_yO_z$ with $0<z\leq(y+2x)$ and preferably $0.7*(y+2x)\leq z\leq(y+2x)$ and particularly preferably $0.9*(y+2x)\leq z\leq(y+2x)$. Protective layers made of tin-zinc oxide with such mix ratios are particularly resistant and exhibit particularly little clouding during aging. In a particularly advantageous embodiment of the fire-resistant pane according to the invention, the protective layer contains $ZnSnO_3$ or $Zn_2SnO_4$ or mixtures thereof. Protective layers made of tin-zinc oxide with such mix ratios are particularly resistant and exhibit particularly little clouding during aging.

In an advantageous embodiment of the fire-resistant pane according to the invention, the protective layer consists of tin-zinc oxide as well as, optionally, a doping material and production-related admixtures. Protective layers made of tin-zinc oxide with such mix ratios are particularly resistant and exhibit particularly little clouding during aging.

The deposition of the mixed tin-zinc oxide takes place, for example, under addition of oxygen as reaction gas during the cathode sputtering.

In an advantageous embodiment of a protective layer according to the invention, the layer thickness d of the protective layer is from 2 nm to 500 nm, preferably from 3 nm to 50 nm, and particularly preferably from 5 nm to 30 nm. In the case of a two-ply or multilayer protective layer, this is true, in particular, for the entire thickness of the protective layer. Fire-resistant panes with a protective layer with these layer thicknesses exhibited particularly little clouding during aging.

In an advantageous embodiment of the fire-resistant pane according to the invention, the protective layer is implemented as a multilayer and preferably a two-ply layered compound of metal oxide, metal nitride, and/or metal silicide. Preferred is a protective layer that consists of a two-ply layer structure made of a metal nitride, in particular silicon nitride, and a metal oxide, in particular one of the above-mentioned mixed tin-zinc oxides or doped mixed tin-zinc oxide. Such two-ply protective layers have proved to be particularly resistant against alkaline fire-resistant layers and exhibit even less clouding during aging than single-layer protective layers.

As investigations of the inventors revealed, a two-ply protective layer with a protective (sub)layer made of a metal nitride and, in particular, of silicon nitride has the advantage that the second protective (sub)layer made of a metal oxide and, in particular, of tin-zinc oxide, can be implemented thinner than with a single-ply protective layer made of metal oxide. Such two-ply protective layers are, nevertheless, particularly resistant against alkaline fire-resistant layers and exhibit little clouding during aging.

An inventive effect already occurs when the protective (sub)layer made of silicon nitride has a thickness of only a few nanometers, preferably from 1 nm to 15 nm and particularly preferably from 3 nm to 10 nm.

A synergistic interaction of a silicon nitride layer with the tin-zinc oxide layer even makes it possible that the second protective (sub)layer made of tin-zinc oxide can be reduced such that the total layer thickness of the two-ply protective layer can be selected smaller than in the case of a protective layer made of a monolayer made of tin-zinc oxide, with unchanged good resistance to the fire-resistant layer. A reduction of the total layer thickness of the protective layer can result in an improvement of the optical properties of the fire-resistant pane, as well as increased transparency and less color deviation. Metal nitride layers and, in particular, silicon nitride layers are very easy and economical to produce from a process technology standpoint and have high optical transparency. In particular, silicon nitride layers are more economical to produce than tin-zinc oxide layers.

In an advantageous embodiment, the protective (sub)layer made of silicon nitride is arranged directly on the tin bath side of the float glass pane and the protective (sub)layer made of tin-zinc oxide on the protective (sub)layer made of silicon nitride. Of course, the order of the materials can also be permuted such that a protective (sub)layer made of tin-zinc oxide is arranged directly on the tin bath side of the float glass and a protective (sub)layer made of silicon nitride is arranged on the protective (sub)layer made of tin-zinc oxide.

The float glass pane according to the invention is produced in a float method. Such methods are known, for example, from FR 1 378839 A. In float glass production, in a continuous process, doughy-liquid molten glass is continuously fed from one side on an elongated bath of liquid tin. The molten glass floats on the tin bath and spreads out as a uniform glass film. As a result of the surface tensions of the tin and of the liquid glass, a very smooth surface is formed. On the back end of the tin bath, the molten glass is cooled and solidified. In the context of the present invention, the side of the float glass pane that floats on the tin bath during production is referred to as the "tin bath side". The side of the float glass pane opposite the tin bath side is referred to as the "atmosphere side".

The float glass pane contains or consists preferably of borosilicate glass, alumosilicate glass, or alkaline-earth silicate glass and particularly preferably of soda lime glass and in particular soda lime glass in accordance with the standard EN 572-1:2004.

The float glass pane is advantageously thermally tempered or partially tempered. The thermally partially tempered or tempered float glass pane preferably has a pretension from 30 MPa to 200 MPa and particularly preferably from 70 MPa to 200 MPa. Such tempered or partially tempered float glass panes are known, for example, from DE 197 10 289 C1. Thermally tempered or partially tempered float glass panes are, due to their higher stability, particularly suitable for fire-resistant panes and the effect of the protective layer according to the invention is particularly advantageous.

The thickness of the float glass pane can vary widely and thus be ideally adapted to the requirements of the individual case. Preferably, panes with the standard thicknesses from 1 mm to 25 mm and preferably from 2 mm to 12 mm are used. The size of the pane can vary widely and is determined by the size of the use according to the invention.

The float glass pane can have any three-dimensional shape. Preferably, the three-dimensional shape has no shadow zones such that it can, for example, be coated by cathode sputtering. Preferably, the pane is planar or slightly or greatly bent in one or a plurality of spatial directions. The float glass can be colorless or colored.

The float glass pane according to the invention can consist of a composite of two or more individual float glass panes that are bonded to each other in each case via at least one interlayer. The interlayer preferably contains a thermoplastic plastic, such as polyvinyl butyral (PVB), ethylene vinyl acetate (EVA), polyurethane (PU), polyethylene terephthalate (PET), or multiple layers thereof, preferably with thicknesses from 0.3 mm to 0.9 mm.

In an advantageous embodiment of the fire-resistant pane according to the invention, at least one adhesion-improving layer or one adhesion-reducing layer is arranged between the protective layer and the fire-resistant layer. The adhesion-improving layer contains, for example, organically hydrophilic substances based on silanes, titanates, or zirconates, and is, for example, known from EP 0 001 531 B1 and EP 0 590 978 A1. Adhesion-reducing layers contain, for example, hydrophobic organofunctional silanes such as fluoroalkylsilanes, perfluoroalkylsilanes, fluoroalkyltrichlorosilanes, fluoroalkylalkoxysilanes, perfluoroalkylalkoxysilanes, fluoroaliphatic silyl ether, alkylsilanes, and phenylsilanes and silicones. Such hydrophobic organofunctional silanes are known, for example, from DE 19731416 C1. Alternative adhesion-reducing layers contain polymer-waxes, preferably based on polyethylene.

In an advantageous embodiment of a fire-resistant pane according to the invention, at least one other layer, which, for example, influences the optical properties of the fire resistant pane, is arranged between the tin bath side of the float glass pane and the protective layer. Such an additional layer increases, for example, the transmittance through the fire-resistant pane, reduces reflections, or gives color to the transmitted light.

The protective layer is advantageously transparent to electromagnetic radiation, preferably electromagnetic radiation of a wavelength from 300 nm to 1,300 nm, and in particular to visible light. "Transparent" means that the total transmittance through the float glass pane coated with the protective layer has a transmittance of more than 50%, preferably of more than 70%, and particularly preferably of more than 90%.

The invention is further directed toward a fire-resistant glazing assembly that includes at least
one fire-resistant pane according to the invention and
one second float glass pane with an atmosphere side and a tin bath side,
wherein the second float glass pane is bonded in a planar manner via its atmosphere side to the fire-resistant layer of the fire-resistant pane.

An alternative embodiment of a fire-resistant glazing assembly according to the invention includes at least
one fire-resistant pane according to the invention and
a second float glass pane with an atmosphere side and a tin bath side,
wherein the second float glass pane has, on the tin bath side, a second protective layer according to the invention, and the second float glass pane is bonded via the second protective layer to the fire-resistant layer of the fire-resistant pane in a planar manner.

In an advantageous improvement of the fire-resistant glazing assembly according to the invention, the atmosphere side of the float glass pane of the fire-resistant pane is bonded to a second fire-resistant layer in a planar manner, and the second fire-resistant layer is bonded to the atmosphere side of a third float glass pane in a planar manner.

In an alternative improvement of the fire-resistant glazing assembly according to the invention, the atmosphere side of the float glass plane of the fire-resistant pane is bonded to a second fire-resistant layer in a planar manner, and the second fire-resistant layer is bonded via another protective layer to the tin bath side of a third float glass pane in a planar manner.

Such triple glazing assemblies exhibit particularly high stability and fire resistance. Of course, analogously, fire-resistant panes with four or more float glass panes can be produced, wherein, for the prevention of clouding of the view due to aging, a protective layer according to the invention is arranged between each fire-resistant layer and the tin bath side of a float glass pane immediately adjacent thereto. Here, "immediately adjacent" means that no glass pane is present between the tin bath side and the fire-resistant layer.

The invention further includes a fire-resistant glazing assembly made up of a stack sequence of a first float glass pane, a first fire-resistant layer, a second float glass pane, a second fire-resistant layer, and a final float glass pane, wherein a protective layer according to the invention is arranged between each tin bath side and a fire-resistant layer arranged immediately adjacent thereto.

In an improvement of this fire-resistant glazing assembly according to the invention, at least one more float glass pane and one more fire-resistant layer are arranged within the stack sequence. Of course, another protective layer according to the invention is arranged between each tin bath side of another float glass pane and a fire-resistant layer arranged immediately adjacent thereto.

To protect the fire-resistant glazing assembly and in particular the fire-resistant layer against heat and UV radiation, the fire-resistant glazing assembly and in particular the outside float glass pane can have additional functional coatings with UV- and/or infrared-reflecting action. Moreover, multiple fire-resistant glazing assemblies can form an insulating glazing assembly by means of evacuated or gas-filled intermediate spaces.

The invention includes a method for producing a fire-resistant glazing assembly, wherein at least:
a. one protective layer is applied on the tin bath side of a first float glass pane,
b. the first float glass pane and a second float glass pane are held at a fixed distance from each other, such that a cavity is formed between the tin bath side of the first float glass pane and the second float glass pane, and
c. a fire-resistant layer is poured in liquid form into the cavity and hardened.

In an advantageous embodiment of the method according to the invention, the process steps are repeated such that a third float glass pane is held at a fixed distance from the first or second float glass pane and the cavity thus formed is filled with a second fire-resistant layer. This process step can occur in parallel, in other words, three or more float glass panes are simultaneously held at a distance and the fire-resistant layers are formed by simultaneous pouring in of the aqueous solution of the silicate or of the hydrogel. Of course, the method for formation of multipane-fire-rated glazing assemblies with four or more float glass panes can accordingly be performed repeatedly.

The application of the protective layer in process step (a) can be done by methods known per se, preferably by magnetic-field-assisted cathode sputtering. This is particularly advantageous with regard to simple, fast, economical, and uniform coating of the float glass pane.

A method for producing mixed tin-zinc oxide layers by reactive cathode sputtering is known, for example, from DE 19848751 C1. The mixed tin-zinc oxide is preferably deposited with a target that contains from 5 wt.-% to 95 wt.-% zinc, from 5 wt.-% to 95 wt.-% tin, and from 0 wt.-% to 10 wt.-% antimony as well as production-related admixtures.

The target particularly preferably contains from 15 wt.-% to 70 wt.-% zinc, from 30 wt.-% to 85 wt.-% tin, and from 0 wt.-% to 5 wt.-% antimony as well as production-related admixtures of other metals. The deposition of the mixed tin-zinc oxide takes place, for example, under addition of oxygen as reaction gas during the cathode sputtering.

The protective layer can, alternatively, be applied by vapor deposition, chemical vapor deposition (CVD), plasma-enhanced chemical vapor deposition (PECVD), by sol-gel methods, or by wet chemical methods.

In process step (b), the first float glass pane and a second float glass pane are held at a fixed distance from each other such that a cavity is formed. This can be done, for example, by spacers that are preferably arranged in the edge region of the float glass panes. The spacers can remain as a fixed component in the fire-resistant glazing assembly or can be removed. Alternatively, the float glass panes can be fixed in position by external holders.

In process step (c), a pourable solution of the fire-resistant layer is poured into the cavity and hardened to form a fire-resistant layer. In the case of a fire-resistant layer made of a water-containing alkali polysilicate, for example, an alkali silicate is integrated with a hardener that contains or releases silicon dioxide. The pourable compound formed therefrom is poured into the cavity. The compound hardens there retaining its water content to form a solid polysilicate layer. Methods for producing a fire-resistant layer made of a hydrogel are known, for example, from WO 94/04355 or DE 40 01 677 C1.

In an advantageous improvement of the method according to the invention, before the process step (a) or between the process steps (a) and (b), the first float glass pane and/or the first float glass pane as well as the second float glass pane are thermally tempered or partially tempered.

The invention further includes the use of a protective layer according to the invention between the tin bath side of a float glass pane and a fire-resistant layer, in particular an alkaline fire-resistant layer, to reduce the clouding of the float glass pane due to aging.

The invention further includes the use of a fire-resistant pane as an architectural element, as a room divider, as part of an external facade or a window in a building or in a motor vehicle on land, on water, or in the air, or as a built-in component in furniture and devices.

BRIEF DESCRIPTION OF THE DRAWINGS

The invention is explained in detail in the following with reference to drawings and an example. The drawings are not completely true to scale. The invention is in no way restricted by the drawings. They depict.

DETAILED DESCRIPTION OF THE INVENTION

Figure 1:
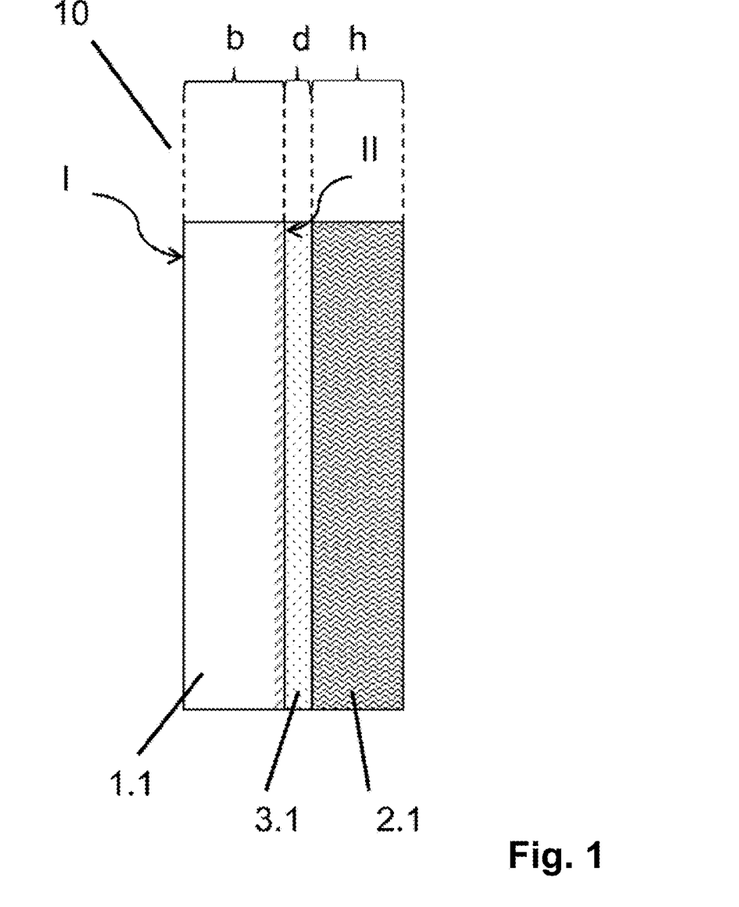
FIG. 1 a schematic cross-sectional view of a fire-resistant pane according to the invention, FIG. 2A a schematic cross-sectional view of a fire-resistant glazing assembly according to the invention, FIG. 2B a schematic cross-sectional view of an alternative exemplary embodiment of a fire-resistant glazing assembly according to the invention, FIG. 3 a schematic cross-sectional view of an alternative exemplary embodiment of a fire-resistant glazing assembly according to the invention, FIG. 4A a schematic cross-sectional view of an alternative exemplary embodiment of a fire-resistant glazing assembly according to the invention, FIG. 4B a schematic cross-sectional view of an alternative exemplary embodiment of a fire-resistant glazing assembly according to the invention, FIG. 5 a flowchart of an exemplary embodiment of the method according to the invention, FIG. 6 a diagram of the clouding of the fire-resistant pane according to the invention in comparison with the prior art, FIG. 7 a schematic cross-sectional view of another alternative exemplary embodiment of a fire-resistant pane according to the invention, and FIG. 8 a schematic cross-sectional view of another alternative exemplary embodiment of a fire-resistant glazing assembly according to the invention.

FIG. 1 depicts a schematic view of a fire-resistant pane according to the invention 10 in cross-section. The fire-resistant pane 10 includes a float glass pane 1.1 with an atmosphere side I and a tin bath side II. The float glass pane 1.1 has, for example, a thickness b of 5 mm and dimensions of 2 m×3 m. Of course, the float glass 1.1 can also have different thicknesses and dimensions adapted to the respective intended use.

A protective layer 3.1 is arranged on the tin bath side II of the float glass pane 1.1 in a planar manner. A fire-resistant layer 3.1 made of an alkaline polysilicate is arranged on the protective layer 3.1. The protective layer 3.1 extends partially and preferably substantially completely over the entire tin bath side II of the float glass pane 1.1. The protective layer 3.1 extends, in particular, over the complete surface between the fire-resistant layer 2.1 and the float glass pane 1.1. It can thus be ensured that the surface of the tin bath side II of the float glass pane 1.1 is protected against the alkaline polysilicate of the fire-resistant layer 2.1.

The protective layer 3.1 contains, for example, antimony-doped tin-zinc oxide and was deposited by cathode sputtering. The target for the deposition of the protective layer 3.1 contained 30 wt.-% zinc, 68 wt.-% tin, and 2 wt.-% antimony. The deposition took place under addition of oxygen as reaction gas during the cathode sputtering. The thickness d of the protective layer 3.1 is, for example, 25 nm.

The fire-resistant layer 2.1 contains, for example, a hardened polysilicate, which is formed from an alkali silicate and at least one hardener, for example, from potassium silicate and colloidal silicic acid. In an alternative embodiment, the potassium silicate can also be produced directly from caustic potash solution and silicon dioxide. In the polysilicate, the molar ratio of silicon dioxide and potassium oxide (SiO2:K2O) is, for example, 4.7:1. Such a fire-resistant layer 2.1 is typically alkaline with a pH of 12. The thickness h of the fire-resistant layer 2.1 is, for example, 3 mm.

Figure 2A:
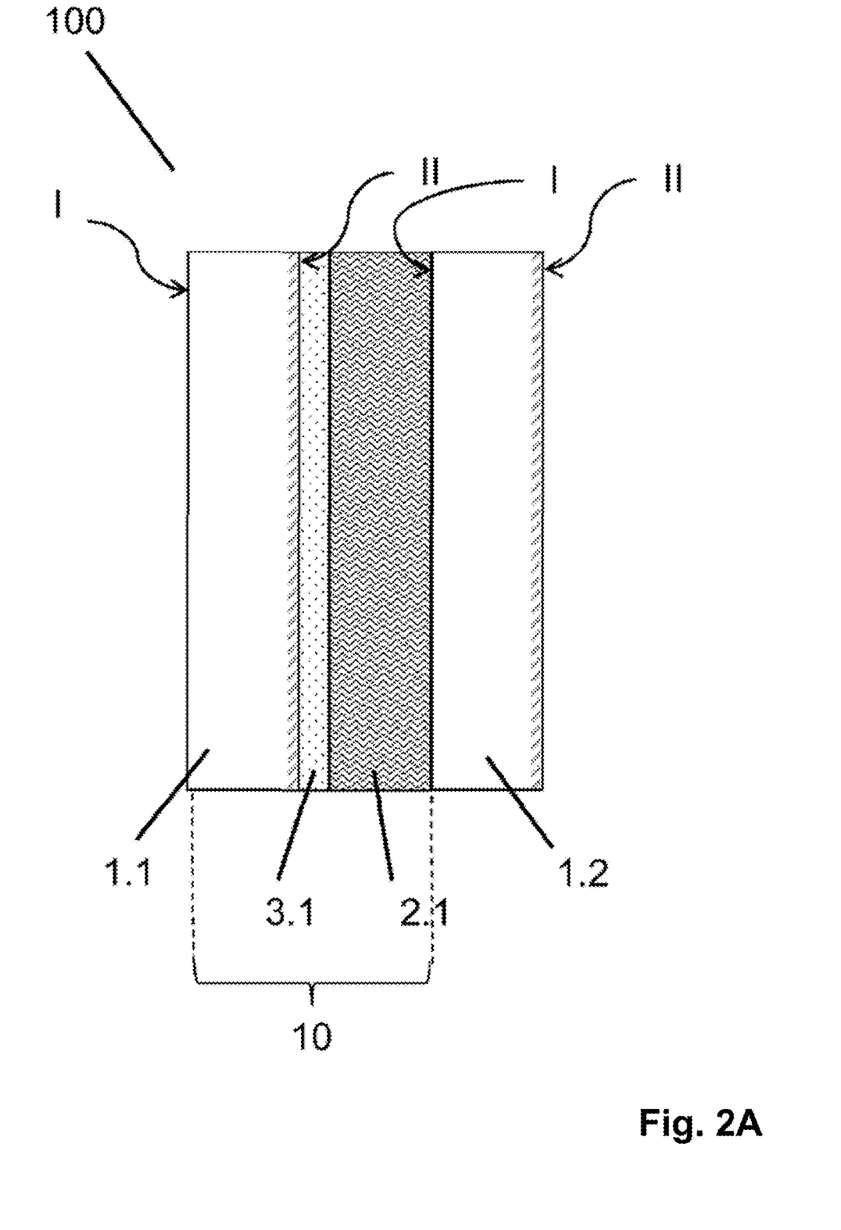

FIG. 2A depicts a schematic cross-sectional view of a fire-resistant glazing assembly according to the invention. The fire-resistant glazing assembly 100 according to the invention comprises, for example, a fire-resistant pane 10 according to the invention, as described in FIG. 1. Furthermore, the fire-resistant layer 2.1 of the fire-resistant pane 10 is bonded in a planar manner, on the side opposite the protective layer 3.1, to the atmosphere side I of a second float glass pane 1.2. The second float glass pane 1.2 corresponds in its characteristics, for example, to the float glass pane 1.1.

Figure 2B:
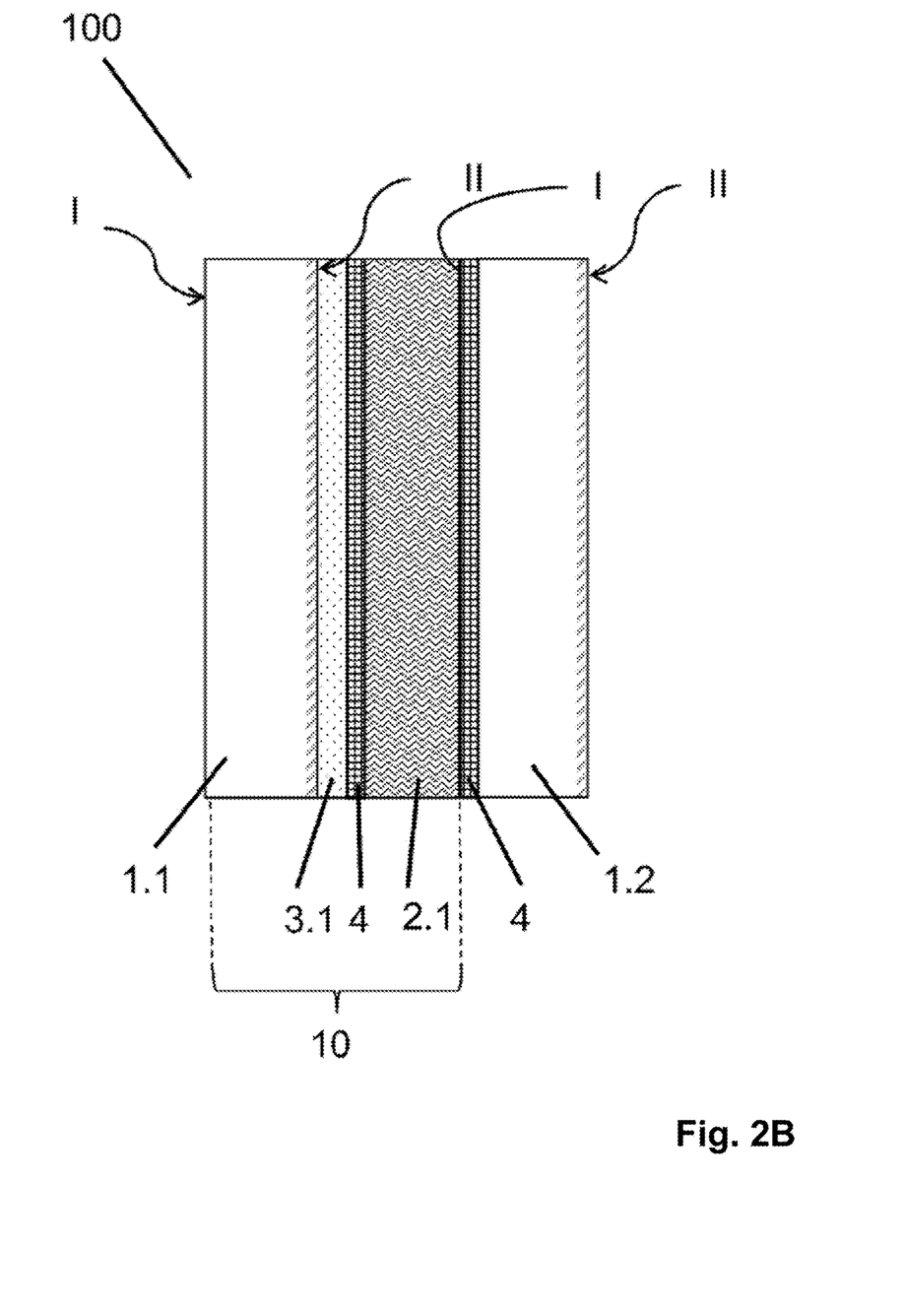

FIG. 2B depicts a schematic cross-sectional view of an alternative exemplary embodiment of a fire-resistant glazing assembly 100 according to the invention. The fire-resistant glazing assembly 100 according to the invention corresponds to that of FIG. 2A. To improve the properties in the event of fire, an adhesion-reducing layer 4 is arranged between the protective layer 3.1 and the fire-resistant layer 2.1 as well as between the fire-resistant layer 2.1 and the second float glass pane 1.2. The adhesion-reducing layer 4 contains, for example, a hydrophobic organofunctional silane. The adhesion-reducing layer 4 has the particular advantage that, in the event of fire, upon breakage of the float glass pane 1.1, 1.2, the individual fragments of the fire-resistant layer 3.1 can detach, without the continuity of the fire-resistant layer 3.1 being lost.

Figure 3:
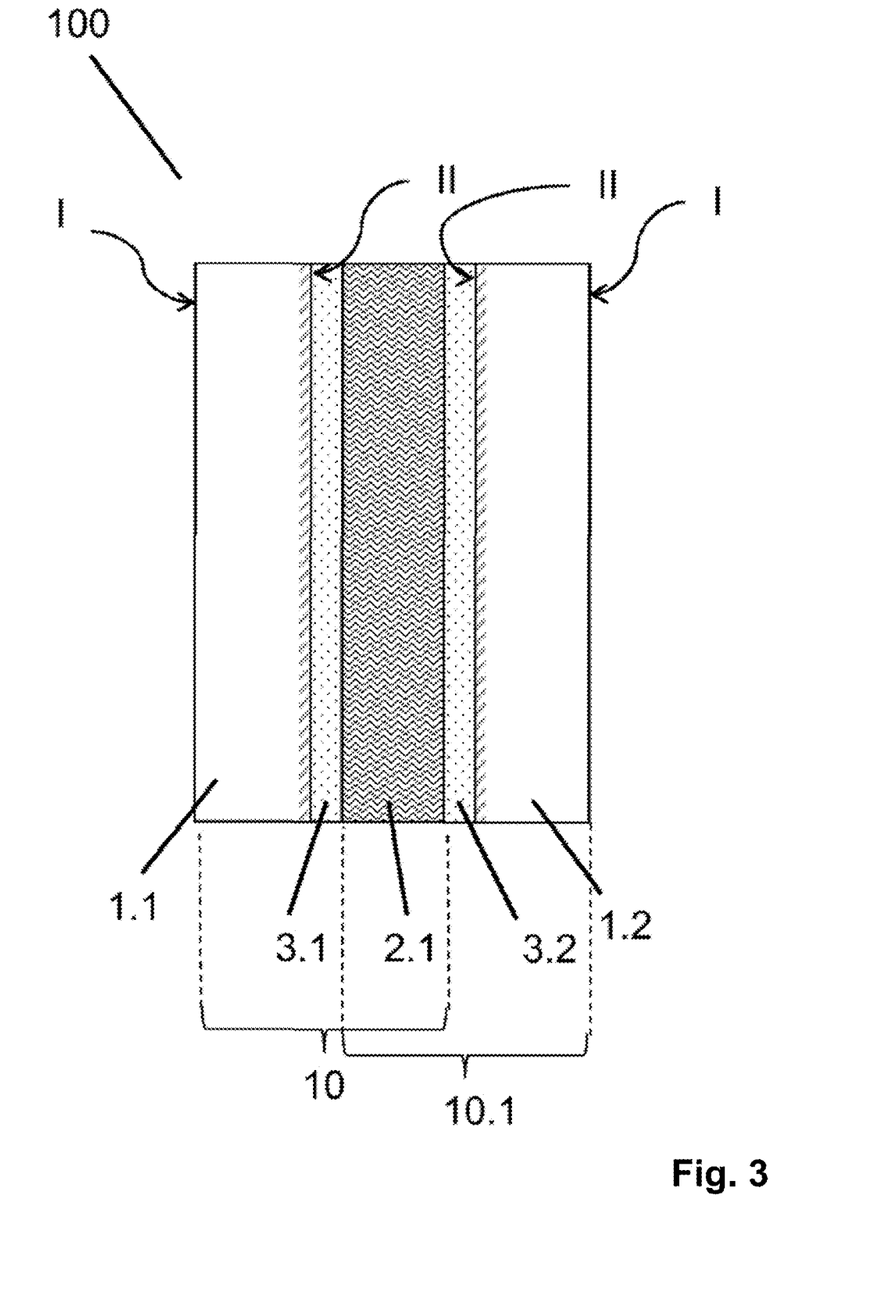

FIG. 3 depicts a schematic cross-sectional view of an alternative exemplary embodiment of a fire-resistant glazing assembly 100 according to the invention. The fire-resistant glazing assembly 100 according to the invention includes, for example, a fire-resistant pane 10 according to the invention, as described in FIG. 1. Furthermore, the fire-resistant layer 2.1 of the fire-resistant pane 10 is bonded in a planar manner, via a second protective layer 3.2, to the tin bath side II of a second float glass pane 1.2, on the side opposite the protective layer 3.1. The second float glass pane 1.2 and the second protective layer 3.2 form, in turn, a fire-resistant pane 10.1 according to the invention with the fire-resistant layer 2.1. Since both the tin bath side II of the float glass pane 1.1 and the tin bath side II of the second float glass pane 1.2 are separated by a protective layer 3.1, 3.2 from the fire-resistant layer 2.1, clouding of the view through the fire-resistant glazing assembly 100 due to aging is prevented according to the invention.

Such a fire-resistant glazing assembly 100 is suitable for independent use as an architectural element in a building or as a motor vehicle glazing assembly.

Figure 4A:
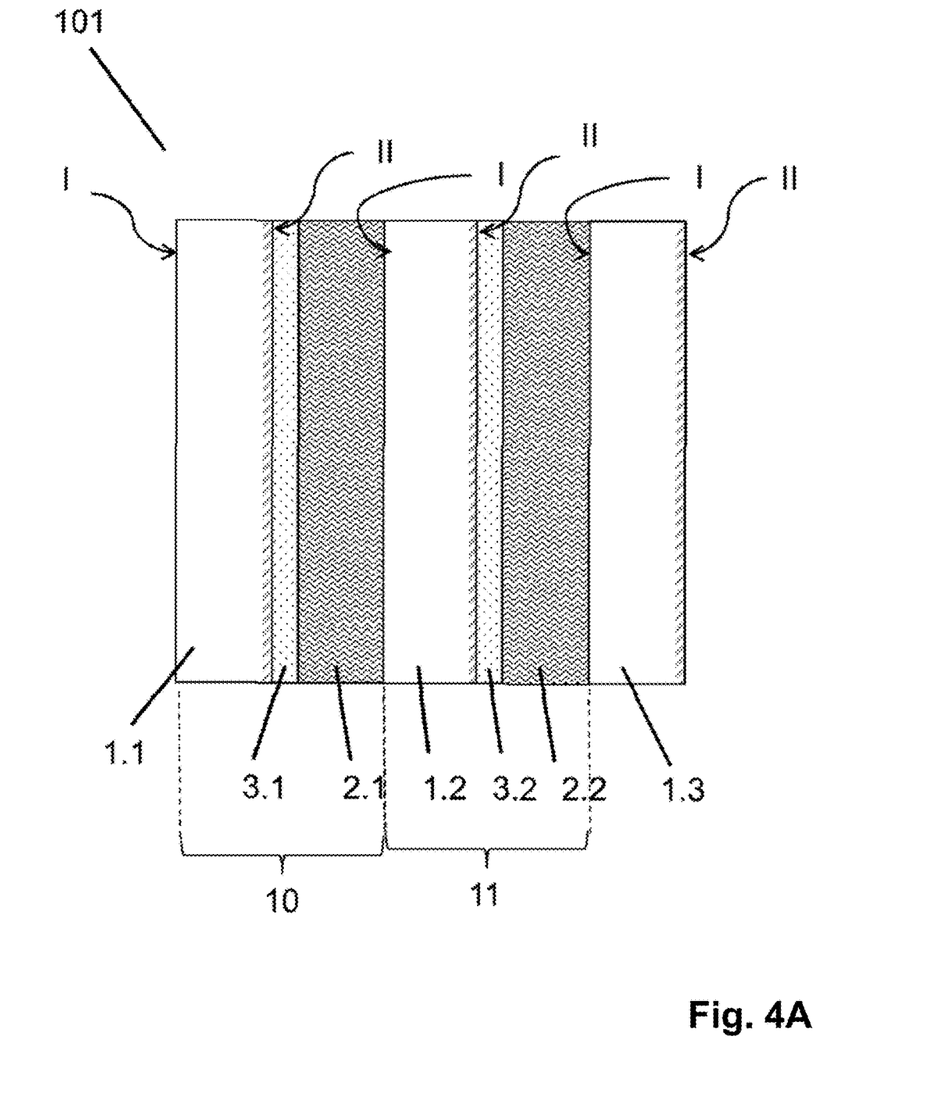

FIG. 4A depicts a schematic cross-sectional view of an alternative exemplary embodiment of a fire-resistant glazing assembly 101 according to the invention, using the example of a triple glazing assembly with three float glass panes 1.1, 1.2, 1.3 and two fire-resistant layers 2.1, 2.2. The fire-resistant glazing assembly 101 according to the invention comprises, for example, a fire-resistant pane 10 according to the invention, as described in FIG. 1. Moreover, the fire-resistant layer 2.1 of the fire-resistant pane 10 is bonded in a planar manner, on the side opposite the protective layer 3.1, to the atmosphere side I of a second float glass pane 1.2. The second float glass pane 1.2 has on its tin bath side II a second protective layer 3.2 and is bonded via this to a second fire-resistant layer 2.2. The second float glass pane 1.2, the protective layer 3.2, and the fire-resistant layer 2.2 form, in turn, a fire-resistant pane II according to the invention. The side of the second fire resistant layer 2.2 facing away from the second protective layer 3.2 is bonded to the atmosphere side I of a third float glass pane 1.3.

Figure 4B:
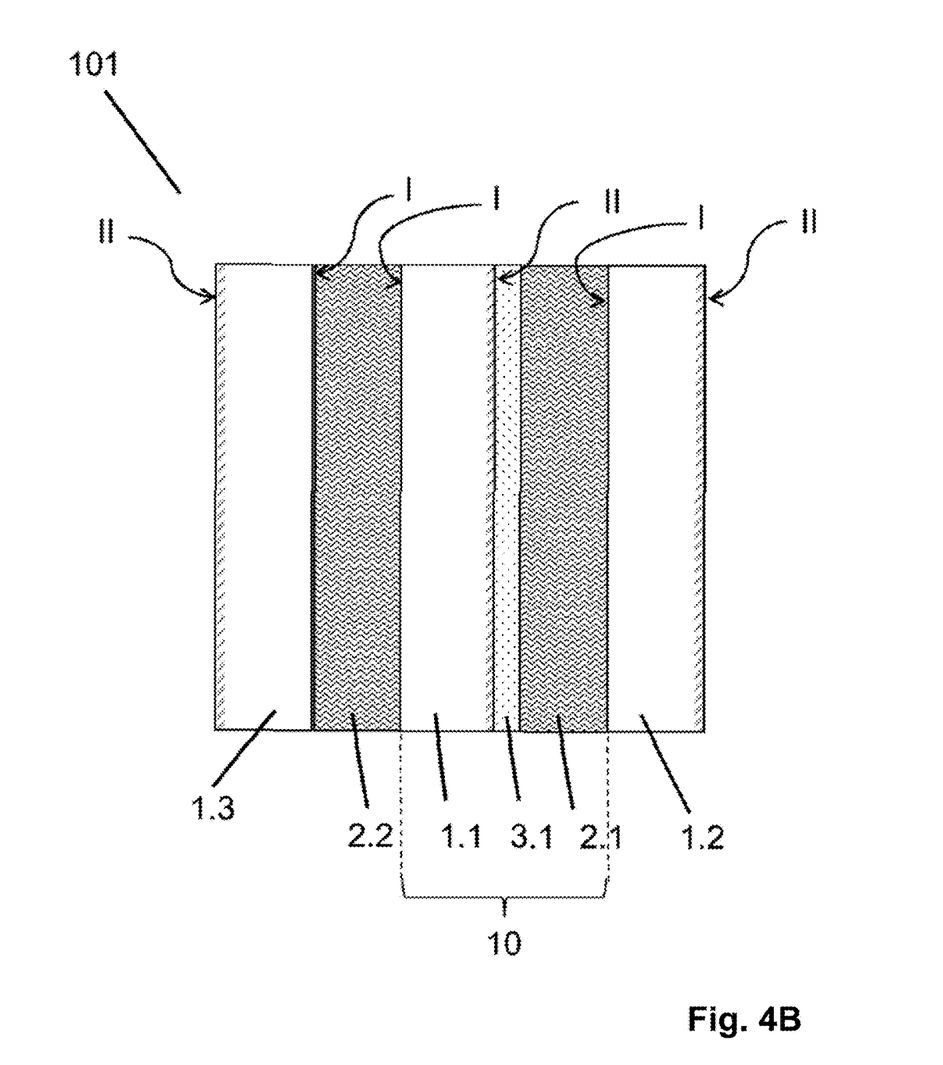

FIG. 4B depicts an alternative exemplary embodiment of a fire-resistant glazing assembly 101 according to the invention. The fire-resistant layer 2.1 of a fire-resistant pane 10 according to the invention is bonded to the atmosphere side I of a second float glass pane 1.2 in a planar manner. Moreover, the atmosphere side I of the float glass pane 1.1 is bonded to a second fire-resistant layer 2.2 in a planar manner. The second fire-resistant layer 2.2 is bonded to the atmosphere side I of a third float glass pane 1.3 in a planar manner. This exemplary embodiment has the particular advantage that only one protective layer 3.1 according to the invention is needed to produce an aging-resistant fire-resistant glazing assembly 101, since by means of a suitable arrangement of the outside float glass panes 1.2, 1.3, only the tin bath side II of the float glass pane 1.1 is arranged directly adjacent to a fire-resistant layer 2.1 without separation by glass.

The triple glazing assemblies depicted in FIGS. 4A and 4B exhibit particularly high stability and fire resistance. Of course, analogously, fire-resistant panes with four or more float glass panes can be produced, wherein, for the prevention of clouding of the view due to aging according to the invention, a protective layer according to the invention is arranged between each fire-resistant layer and the tin bath side of a float glass pane arranged immediately adjacent thereto.

The fire-resistant pane 10, II and the fire-resistant glazing assembly 100,101 of the exemplary embodiment depicted here can contain other spacers, known per se and not depicted here, between the adjacent float glass panes 1.1, 1.2, 1.3 and edge seals around the fire-resistant layers 2.1, 2.2. Suitable materials for the edge seal contain, for example, polyisobutylene as spacers and polysulfide, polyurethane, or silicone as edge adhesive.

Figure 5:
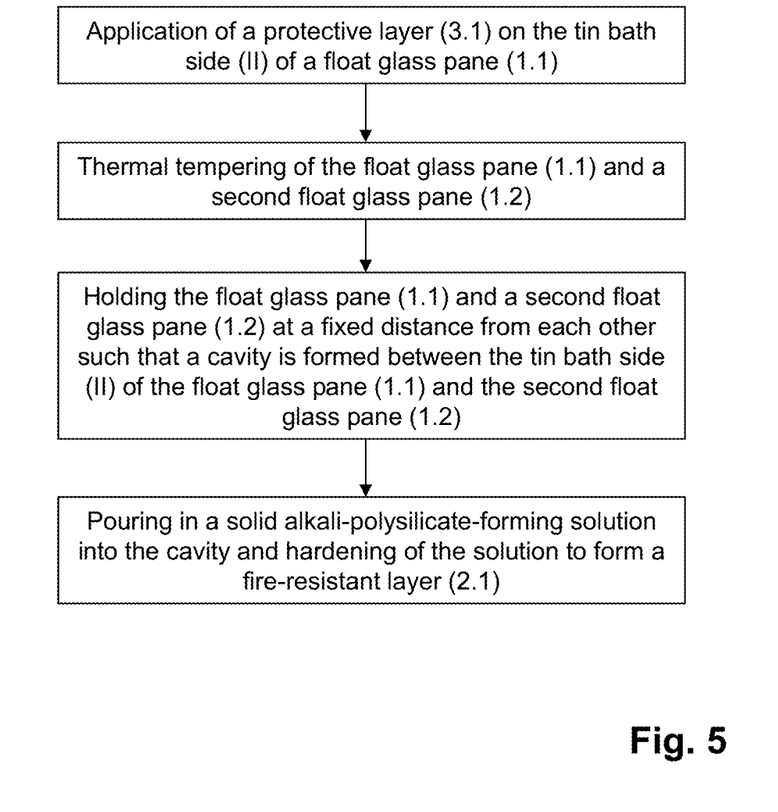

FIG. 5 depicts a flowchart of an exemplary embodiment of the method according to the invention for producing a fire-resistant glazing assembly 100 according to the invention of FIG. 2.

Figure 6:
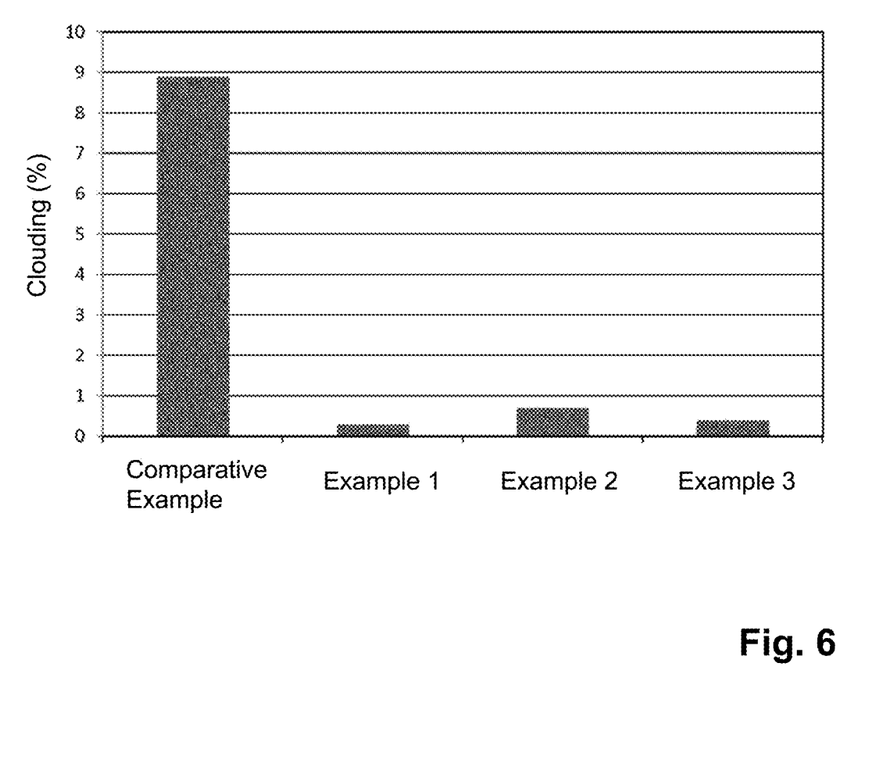

FIG. 6 depicts a diagram of the clouding in an aging test of fire-resistant panes 10 according to the invention compared to a fire-resistant pane according to the prior art as a comparative example. In the accelerated aging test, the respective float glass pane was immersed over a period of 4 hours and at a temperature of 80 in an aqueous solution of potassium silicate. The aqueous potassium silicate solution is the alkaline fraction in the production of a fire-resistant layer according to the invention made of an alkali polysilicate-hydrogel. The clouding was measured with a haze meter of the type "Haze-Gard Plus" of the company BYK-Gardner.

Example 1 is a float glass pane according to the invention, whose tin bath side 1I was coated with a protective layer made of tin-zinc oxide. The ratio of tin to zinc was 50 wt.-%:50 wt.-%. The thickness d of the protective layer was 25 nm. After the aging test, clouding of 0.3% was measured.

Example 2 is a float glass pane according to the invention, whose tin bath side 1I was coated with a protective layer made of zinc oxide. The thickness d of the protective layer was 25 nm. After the aging test, clouding of 0.7% was measured.

Example 3 is a float glass pane according to the invention, whose tin bath side 1I was coated with a protective layer made of indium-tin oxide (ITO). The ratio of indium to tin was 90 wt.-%:10 wt.-%. The thickness d of the protective layer was 25 nm. After the aging test, clouding of 0.4% was measured.

The Comparative Example according to the prior art was a float glass pane, of which neither the atmosphere side I nor the tin bath side II was coated and, thus, both sides were exposed to the aqueous solution of potassium silicate. After the aging test, clouding of 8.9% was measured in the case of the Comparative Example.

In the aging test presented, the atmosphere sides I of the float glass panes of the Examples 1 to 3 and of the Comparative Example were not protected by a protective layer according to the invention and, thus, were directly exposed to the aqueous solution of potassium silicate. It can therefore be concluded that the clouding is caused substantially by the contact of the tin bath side II with the aqueous solution of potassium silicate.

Each of the protective layers according to the invention from Examples 1 to 3 reduced the clouding of the float glass pane compared to the Comparative Example according to the prior art without a protective layer 3 according to the invention to values <1%. In the case of the protective layer according to the invention made of tin-zinc oxide according to Example 1, the clouding was actually reduced by a factor of 89. This result was unexpected and surprising for the person skilled in the art.

Figure 7:
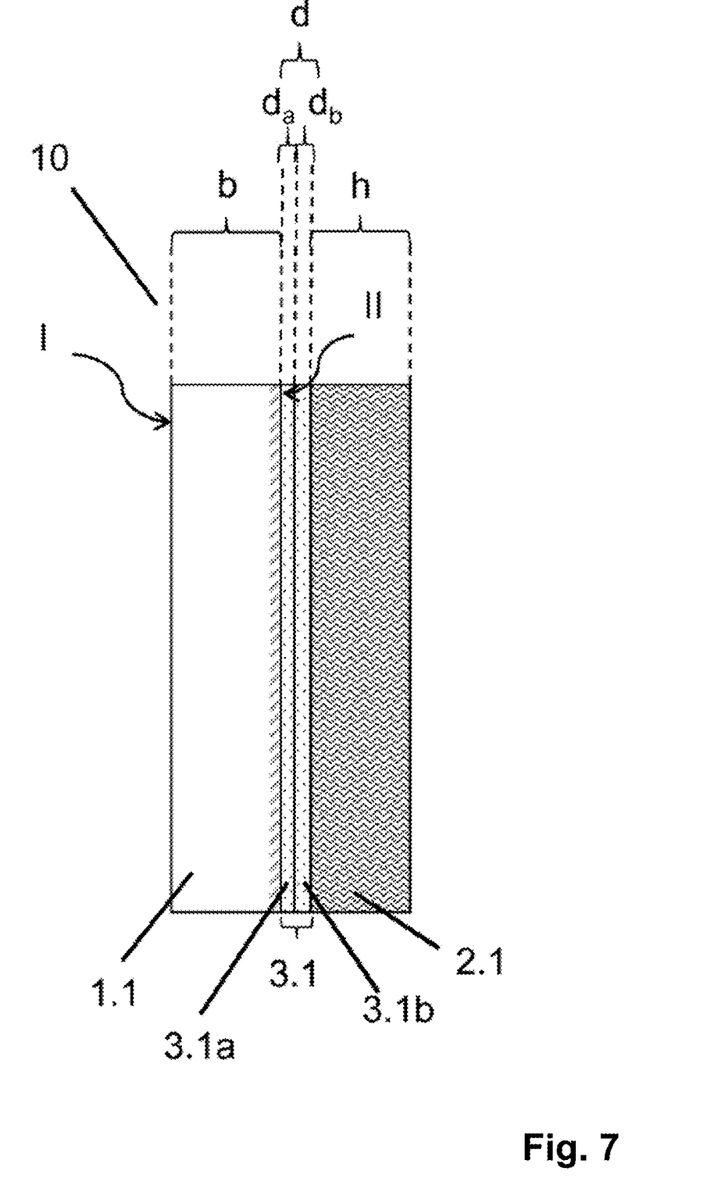

FIG. 7 depicts a schematic view of an alternative exemplary embodiment of a fire-resistant pane 10 according to the invention in cross-section. The float glass pane 1.1 and the fire-resistant layer 2.1 are implemented according to FIG. 1. The protective layer 3.1 is implemented as a two-ply layer structure composed of a first protective (sub)layer 3.1a and a second protective (sub)layer 3.1b. The protective (sub)layer 3.1a has a thickness d, of, for example, 8 nm and is made, for example, of a silicon nitride layer, and, in particular, of Si3N4. The protective (sub)layer 3.1b has a thickness db of, for example, 15 nm and is made, for example, of a tin-zinc oxide layer, as was described in FIG. 1. The thickness d of the entire protective layer 3.1 was thus 23 nm.

As investigations of the inventors revealed, already with a protective (sub)layer 3.1a made of silicon nitride that had a thickness d, of 3 nm, it was possible to obtain advantageously increased aging resistance and greatly reduced clouding. At the same time, it was possible to reduce the thickness of the tin-zinc oxide layer without degrading aging resistance or clouding.

In this exemplary embodiment, the protective (sub)layer 3.1a made of silicon nitride is arranged directly on the tin bath side II of the float glass pane 1.1 and the (protective (sub)layer 3.1b made of tin-zinc oxide is arranged on the protective (sub)layer 3.1a made of silicon nitride. Of course, the order of the materials can also be permuted such that a layer made of tin-zinc oxide is arranged directly on the tin bath side of the float glass pane and a layer made of silicon nitride is arranged on the layer made of tin-zinc oxide.

Figure 8:
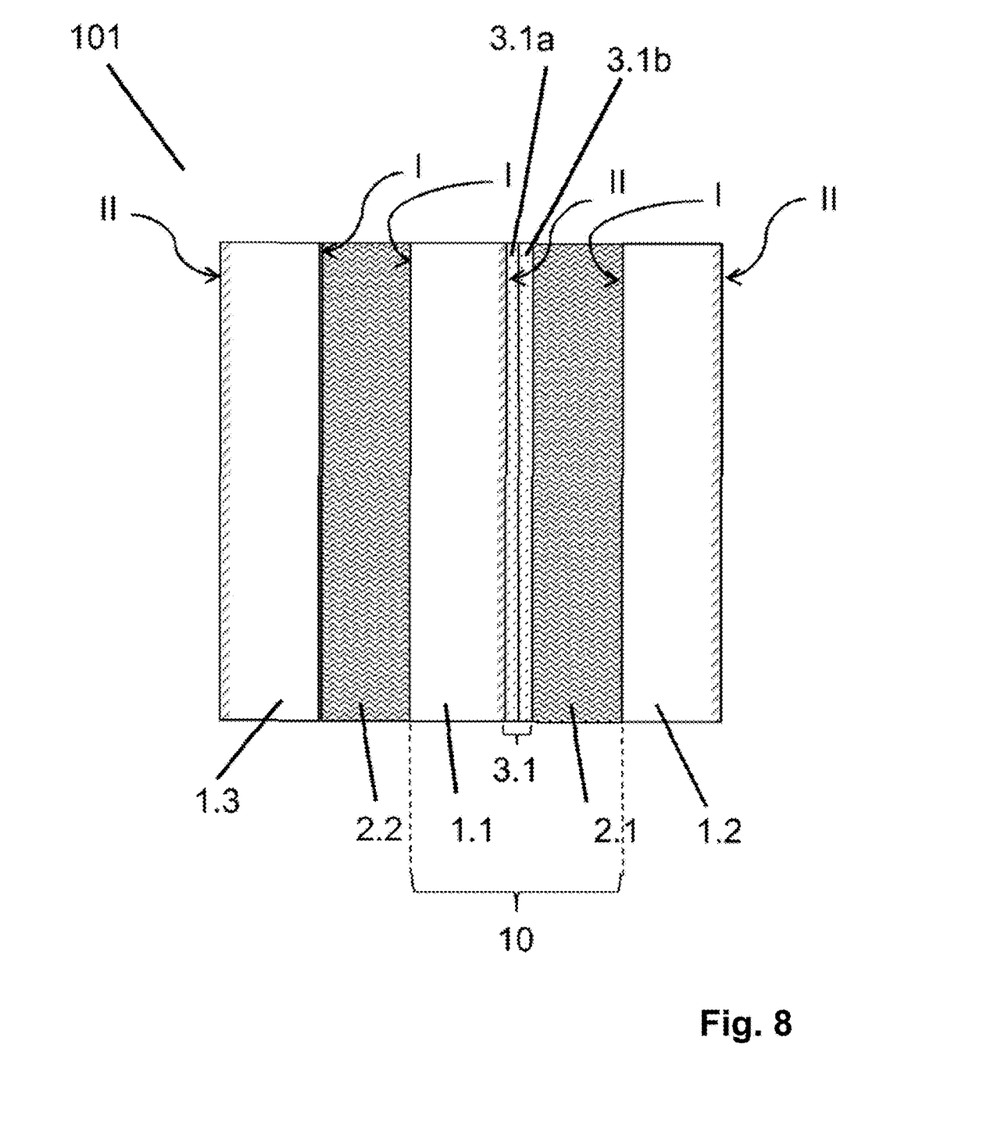

FIG. 8 depicts another alternative exemplary embodiment of a fire-resistant glazing assembly according to the invention 101. The fire-resistant glazing assembly 101 of FIG. 8 corresponds to the fire-resistant glazing assembly 101 of FIG. 4b, wherein only the protective layer 3.1 of FIG. 4b is implemented as a 2-ply layer structure made up of a protective (sub)layer 3.1a and a protective (sub)layer 3.1b. The protective (sub)layers 3.1a and 3.1b correspond, for example, to the layers of FIG. 7.

Table 1 summarizes the results of aging tests and clouding tests for various exemplary embodiments of fire-resistant panes 10 according to the invention.

TABLE 1

| Layer Material | Layer Thickness (n) | Resistance in the Aging Test | Clouding |
| --- | --- | --- | --- |
| tin-zinc oxide (3.1) | 25 nm (3.1) | Good | Slight |
| silicon nitride (3.1a)/ tin-zinc oxide (3.1b) | 8 nm (3.1a)/15 nm (3.1b) | Very good | Very slight |
| silicon nitride (3.1a)/ tin-zinc oxide (3.1b) | 3 nm (3.1a)/15 nm (3.1b) | Good | Slight |
| tin-zinc oxide (3.1a)/ silicon nitride (3.1b) | 15 nm (3.1a)/8 nm (3.1b) | Very good | Very slight |

The first column of Table 1 indicates the material of the protective layer 3.1 and the second column indicates the (layer) thickness. The protective layers 3.1 are in each case arranged directly on the float glass pane 1.1. The statement silicon nitride (3.1a)/tin-zinc oxide (3.1b) indicates that the protective layer 3.1 consists of a 2-ply layer structure. The first indicated protective (sub)layer 3.1a made of silicon nitride is arranged directly on the float glass pane 1.1 and the second protective (sub)layer 3.1b made of tin-zinc oxide is arranged directly on the first protective (sub)layer 3.1a. For the layer sequence tin-zinc oxide (3.1a)/silicon nitride (3.1b) the reverse order applies.

Surprisingly, the layer sequence silicon nitride (3.1a)/tin-zinc oxide (3.1b) with layer thicknesses of 3 nm for the first protection (sub)layer 3.1a and 15 nm for the second protective (sub)layer 3.1b exhibited similarly good aging resistance and slight clouding as a single-ply protective layer 3.1 made of 25 nm tin-zinc oxide, although the overall thickness could be reduced from 25 nm to 18 nm. For layer thickness combinations of 8 nm for silicon nitride and 15 nm for tin-zinc oxide, the experiments actually revealed increased aging resistance and less clouding than with a single-ply protective layer 3.1 made of 25 nm tin-zinc oxide.

As extensive investigations of the inventors revealed, the combination of a layer made of a metal nitride, such as silicon nitride, and a layer made of a metal oxide, such as zinc-tin oxide, is particularly advantageous in order to produce an aging-resistant fire-resistant glazing assembly and to prevent clouding of the tin bath side of a float glass pane in the case of contact with an alkaline fire-resistant layer.

This result was unexpected and surprising for the person skilled in the art.

The invention claimed is:

1. A fire-resistant pane, comprising:
   at least one float pane with a tin bath side,
   a protective layer that is arranged on the tin bath side in a planar manner, and
   at least one fire-resistant layer that is arranged on the protective layer in a planar manner,
   wherein the protective layer is a multilayer structure comprising first and second sublayers, the first sublayer being on the tin bath side of the float pane and comprising a nitride, and the second sublayer being disposed between the first sublayer and the at least one fire-resistant layer and comprising an oxide; and
   wherein the oxide of the second sublayer is one of tin-zinc oxide and a doped tin-zinc oxide.

2. The fire-resistant pane according to claim 1, wherein the fire-resistant layer is alkaline.

3. The fire-resistant pane according to claim 1, wherein the fire-resistant layer contains alkali silicate, alkali phosphate, alkali tungstate, alkali molybdate, and/or mixtures or layered compounds thereof, and wherein the alkali element is sodium, potassium, lithium, and/or mixtures thereof.

4. The fire-resistant pane according to claim 1, wherein the fire-resistant layer contains a hydrogel of cross-linked monomers, and/or polymers comprising polyacrylamide, poly-N-methylolacrylamide, or polymerized 2-hydroxy-3-methacryloxypropyltrimethylammonium chloride.

5. The fire-resistant pane according to claim 1, wherein the second sublayer contains tin-zinc oxide and wherein a ratio of zinc:tin ranges from 5 wt. %:95 wt. % to 95 wt. %:5 wt. %.

6. The fire-resistant pane according to claim 1 or 5, wherein the protective layer contains at least one dopant comprising antimony, fluorine, silver, ruthenium, palladium, aluminum, or tantalum, and the fraction of the dopant in the metal fraction of the protective layer is from 0 wt. % to 10 wt. %.

7. The fire-resistant pane according to claim 1, wherein the nitride of the first sublayer is one of a metal nitride and a silicon nitride.

8. The fire-resistant pane according to claim 1, wherein the protective layer has a thickness from 2 nm to 500 nm.

9. The fire-resistant pane according to claim 1, wherein the float glass pane contains borosilicate glass, aluminosilicate glass, alkaline earth silicate glass, or soda lime glass, and/or the float glass pane is thermally tempered or partially tempered.

10. The fire-resistant pane according to claim 1, wherein the float glass pane has a thickness from 1 mm to 25 mm.

11. The fire-resistant pane according to claim 1, wherein at least one adhesion-improving layer or one adhesion-reducing layer, which contains at least one organofunctional silane or at least one polymer-wax, is arranged between the protective layer and the fire-resistant layer.

12. The fire-resistant pane according to claim 3, wherein the fire-resistant layer contains alkali polysilicate, alkali polyphosphate, alkali polytungstate, alkali polymolybdate, and/or mixtures or layered compounds thereof.

13. The fire-resistant pane according to claim 9, wherein the float glass pane contains soda lime glass according to standard EN 572-1:2004.

* * * * *